(12) United States Patent
Iitsuka et al.

(10) Patent No.: US 12,231,823 B2
(45) Date of Patent: Feb. 18, 2025

(54) OPTICAL ELEMENT UNIT, LIGHT SOURCE APPARATUS, AND PROJECTOR

(71) Applicant: SEIKO EPSON CORPORATION, Tokyo (JP)

(72) Inventors: Koichi Iitsuka, Azumino (JP); Norikazu Kadotani, Azumino (JP); Takanao Enokishima, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/945,197

(22) Filed: Sep. 15, 2022

(65) Prior Publication Data

US 2023/0082820 A1 Mar. 16, 2023

(30) Foreign Application Priority Data

Sep. 15, 2021 (JP) ................. 2021-150051

(51) Int. Cl.
*H04N 9/31* (2006.01)
*G03B 21/16* (2006.01)

(52) U.S. Cl.
CPC .......... *H04N 9/3144* (2013.01); *G03B 21/16* (2013.01); *H04N 9/3108* (2013.01)

(58) Field of Classification Search
CPC ..... H04N 9/3144; H04N 9/3108; G03B 21/16
See application file for complete search history.

(56) References Cited

U.S. PATENT DOCUMENTS

| | | | |
|---|---|---|---|
| 6,618,213 B2* | 9/2003 | Inamoto ................ | G02B 7/008 362/322 |
| 2015/0029472 A1* | 1/2015 | Lin ...................... | H04N 9/3144 353/56 |
| 2015/0229892 A1* | 8/2015 | Dai ........................ | G03B 21/16 353/31 |
| 2017/0192346 A1* | 7/2017 | Chikayama .......... | G02B 26/008 |
| 2019/0116343 A1 | 4/2019 | Nakamura et al. | |
| 2023/0014373 A1* | 1/2023 | Hansen ................. | G03B 21/16 |

FOREIGN PATENT DOCUMENTS

| | | |
|---|---|---|
| JP | 2017-215563 A | 12/2017 |
| JP | 2019-74695 A | 5/2019 |

* cited by examiner

*Primary Examiner* — Jerry L Brooks
(74) *Attorney, Agent, or Firm* — Dority & Manning, P.A.

(57) ABSTRACT

An optical element unit according to an aspect of the present disclosure includes an optical element wheel that includes a heat dissipation member provided at one surface of a wheel substrate, a housing including an outer circumferential wall that covers the outer circumference of the optical element wheel, and an opening formed at part of the outer circumferential wall, the housing capable of housing the optical element wheel, a first duct which is provided at the opening of the housing and via which the airflow generated by the optical element wheel is exhausted out of the housing, a heat exchanger which is disposed at the outlet of the first duct and to which the airflow exhausted via the outlet flows, and a second duct that guides the airflow having flowed through the heat exchanger to the heat dissipation member of the optical element wheel.

13 Claims, 8 Drawing Sheets

OPTICAL ELEMENT UNIT, LIGHT SOURCE APPARATUS, AND PROJECTOR

The present application is based on, and claims priority from JP Application Serial Number 2021-150051, filed Sep. 15, 2021, the disclosure of which is hereby incorporated by reference herein in its entirety.

BACKGROUND

1. Technical Field

The present disclosure relates to an optical element unit, a light source apparatus, and a projector.

2. Related Art

As a light source apparatus for projectors, there is a technology that allows fluorescence generated by a phosphor wheel (optical element wheel) to be used as illumination light. For example, JP-A-2019-74695 discloses a technology for blowing airflow onto a heat dissipation member provided as part of a phosphor wheel in a sealed light source unit to cool the heat dissipation member, cooling the airflow having cooled the heat dissipation member with the aid of a heat exchanger, and circulating the cooled airflow to the optical element wheel.

In the light source unit, in which the air having cooled the wheel and hence having been heated is scattered in the unit, the scattered air can cause thermal damage or deformation to other optical parts such as lenses and mirrors disposed in the unit.

To prevent the problem described above, the technology disclosed in JP-A-2017-215563 allows the phosphor wheel and the heat exchanger to be housed in a storage container to suppress the influence of the heat exhausted from the phosphor wheel on the other optical parts.

On the other hand, there has in recent years been a demand for higher luminance of the illumination light in the light source unit used in a projector, and it is therefore necessary to further improve the efficiency at which the phosphor wheel is cooled.

It cannot, however, be believed that the technology disclosed in JP-A-2017-215563 provides adequate efficiency at which the phosphor wheel is cooled, and there is room for further improvement. It has therefore been desired to provide a new technology that allows more efficient cooling of an optical element wheel.

SUMMARY

To solve the problem described above, according to an aspect of the present disclosure, there is provided an optical element unit that includes an optical element wheel that includes a heat dissipation member provided at one surface of a wheel substrate and causes airflow to flow outward in a radial direction when the wheel substrate rotates, a housing including an outer circumferential wall that covers an outer circumference of the optical element wheel, and an opening formed at part of the outer circumferential wall, the housing capable of housing the optical element wheel, a first duct which is provided at the opening of the housing and via which the airflow generated by the optical element wheel is exhausted out of the housing, a heat exchanger which is disposed at an outlet of the first duct and to which the airflow exhausted via the outlet flows, and a second duct that guides the airflow flowing through the heat exchanger to the heat dissipation member of the optical element wheel.

According to a second aspect of the present disclosure, there is provided a light source apparatus including the optical element unit according to the first aspect of the present disclosure, and a light source that radiates light to the optical element unit.

According to a third aspect of the present disclosure, there is provided a projector including the light source apparatus according to the second aspect of the present disclosure, a light modulator that modulates light from the light source apparatus in accordance with image information, and a projection optical apparatus that projects the light modulated by the light modulator.

DESCRIPTION OF EXEMPLARY EMBODIMENTS

Embodiments of the present disclosure will be described below in detail with reference to the drawings.

In the drawings used in the description below, a characteristic portion is magnified for convenience in some cases for clarity of the characteristic thereof, and the dimension ratio and other factors of each component are therefore not always equal to actual values.

First Embodiment

An example of a projector will be described as a first embodiment of the present disclosure.

Figure 1:
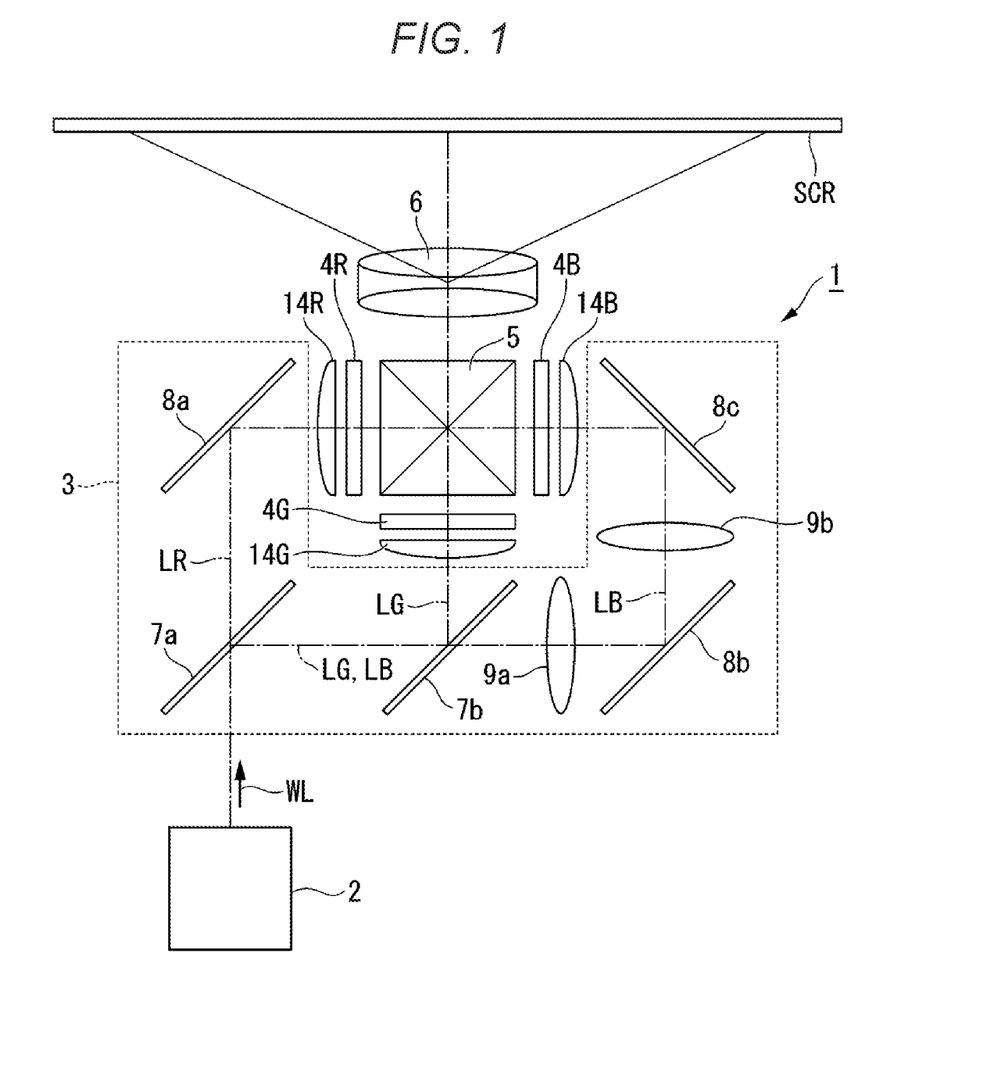
FIG. 1 shows a schematic configuration of a projector according to a first embodiment.

FIG. 1 shows a schematic configuration of the projector according to the present embodiment.

A projector 1 according to the present embodiment is a projection-type image display apparatus that displays color video images on a screen SCR, as shown in FIG. 1. The projector 1 includes a light source apparatus 2, a color separation system 3, light modulators 4R, 4G, and 4B, a light combining system 5, and a projection optical apparatus 6.

The color separation system 3 separates white illumination light WL from the light source apparatus 2 into red light LR, green light LG, and blue light LB. The color separation system 3 includes a first dichroic mirror 7a, a second dichroic mirror 7b, a first total reflection mirror 8a, a second total reflection mirror 8b, a third total reflection mirror 8c, a first relay lens 9a, and a second relay lens 9b.

The first dichroic mirror 7a separates the illumination light WL from the light source apparatus 2 into the red light LR and the other light formed of the green light LG and the blue light LB. The first dichroic mirror 7a transmits the separated red light LR and reflects the separated other light. The second dichroic mirror 7b reflects the green light LG and transmits the blue light LB.

The first total reflection mirror 8a reflects the red light LR toward the light modulator 4R. The second total reflection mirror 8b and the third total reflection mirror 8c guide the blue light LB to the light modulator 4B. The green light LG is reflected off the second dichroic mirror 7b toward the light modulator 4G.

The first relay lens 9a is disposed in the optical path of the blue light LB between the second dichroic mirror 7b and the second total reflection mirror 8b. The second relay lens 9b is disposed in the optical path of the blue light LB between the second total reflection mirror 8b and the third reflection mirror 8c.

The light modulator 4R modulates the red light LR in accordance with image information to form red image light. The light modulator 4G modulates the green light LG in accordance with image information to form green image light. The light modulator 4B modulates the blue light LB in accordance with image information to form blue image light.

The light modulators 4R, 4G, and 4B are each, for example, a transmissive liquid crystal panel. Polarizers that are not shown are disposed on the light incident side and the exiting side of each of the liquid crystal panels.

Field lenses 14R, 14G, and 14B are disposed on the light incident side of the light modulators 4R, 4G, and 4B, respectively.

The red image light from the light modulator 4R, the green image light from the light modulator 4G, and the blue image light from the light modulator 4B enter the light combing system 5. The light combining system 5 combines the red image light, the green image light, and the blue image light with one another and outputs the combined image light toward the projection optical apparatus 6. The light combining system 5 is formed, for example, of a cross dichroic prism.

The projection optical apparatus 6 is formed of a projection lens group, magnifies the combined image light from the light combining system 5, and projects the magnified image light toward the screen SCR. Magnified color video images are thus displayed on the screen SCR.

Light Source Apparatus

The configuration of the aforementioned light source apparatus 2 will be described below.

Figure 2:
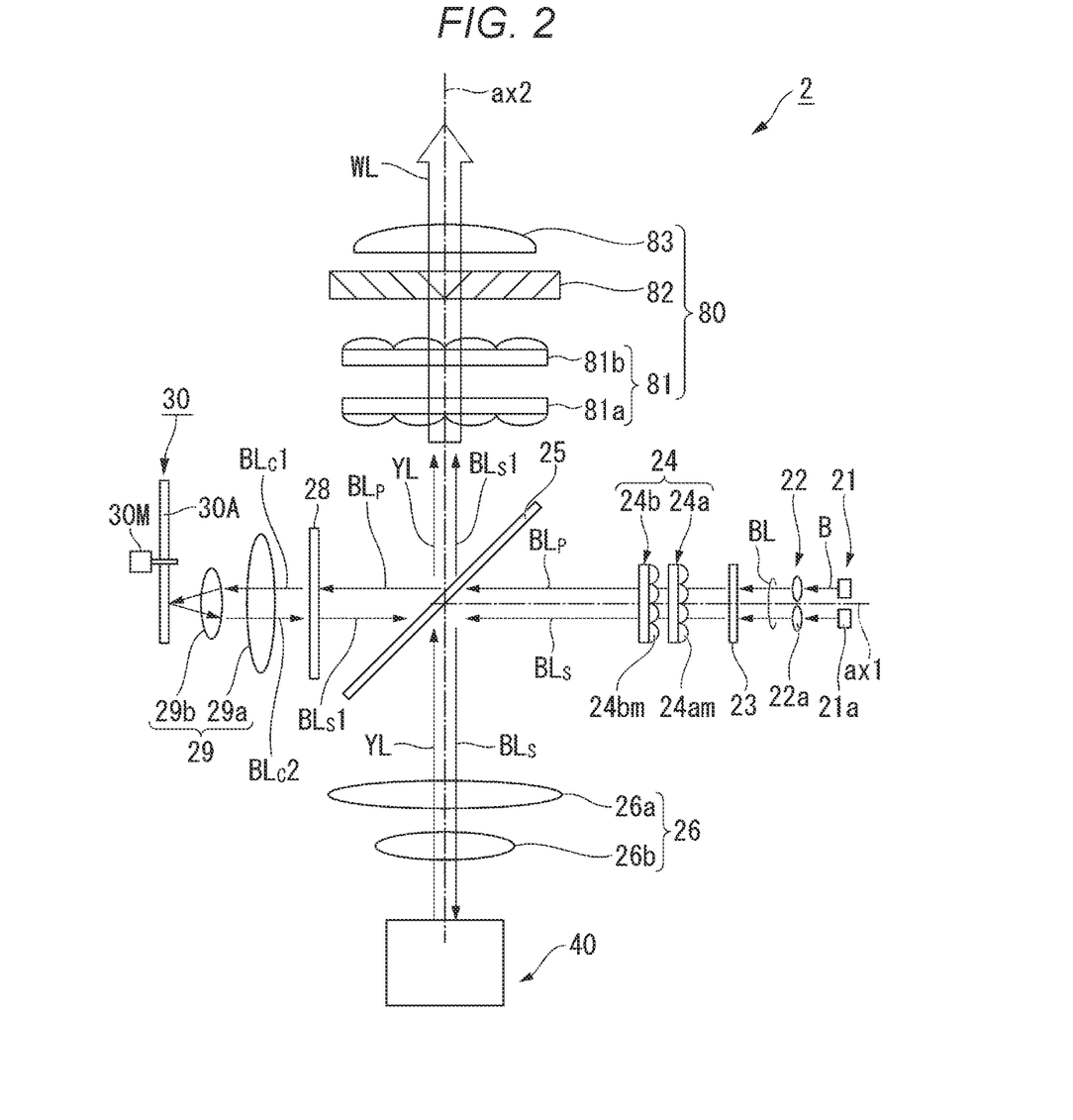
FIG. 2 shows a schematic configuration of a light source apparatus.

FIG. 2 shows a schematic configuration of the light source apparatus 2. The following description shows as an example a light source apparatus using a reflective fluorescent wheel that receives excitation light and outputs via a reflection member fluorescence into which the excitation light is converted by a wavelength converter.

The light source apparatus 2 includes a light source 21, a collimator system 22, a first retardation film 23, a homogenizer system 24, a polarization separator 25, a first light collection system 26, a wavelength conversion unit 40, which is an optical element unit, a second retardation film 28, a second light collection system 29, a diffusive reflector 30, and a uniform illumination system 80, as shown in FIG. 2.

Out of the components described above, the light source 21, the collimator system 22, the first retardation film 23, the homogenizer system 24, the polarization separator 25, the second retardation film 28, the second light collection system 29, and the diffusive reflector 30 are sequentially arranged along an optical axis ax1.

On the other hand, the wavelength conversion unit 40, the first light collection system 26, the polarization separator 25, the uniform illumination system 80 are sequentially arranged along an illumination optical axis ax2 of the light source apparatus 2. The optical axis ax1 and the illumination optical axis ax2 are positioned so as to be present in the same plane and perpendicular to each other.

The light source 21 is formed of a plurality of semiconductor lasers 21a, which each output blue light B formed of laser light. The wavelength at which the intensity of the outputted blue light B peaks, for example, is about 445 nm. A semiconductor laser that outputs blue light having a wavelength other than 445 nm, for example, blue light having a wavelength of 455 nm or 460 nm can instead be used as each of the semiconductor lasers 21a.

The optical axis ax1 of the light source 21 is perpendicular to the illumination optical axis ax2 of the light source apparatus 2. The light source 21 is formed of the plurality of semiconductor lasers 21a arranged in an array in a plane perpendicular to the optical axis ax1. Based on the configuration described above, the light source 21 outputs a pencil of light BL containing a plurality of blue beams B.

The pencil of light BL outputted from the light source 21 enters the collimator system 22. The collimator system 22 converts the pencil of light BL outputted from the light source 21 into parallelized luminous flux. The collimator system 22 is formed, for example, of a plurality of collimator lenses 22a arranged in an array. The plurality of collimator lenses 22a are arranged in correspondence with the plurality of semiconductor lasers 21a.

The pencil of light BL having passed through the collimator system 22 enters the first retardation film 23. The first retardation film 23 is, for example, a half wave plate configured to be rotatable. The blue light B outputted from the semiconductor lasers 21a is linearly polarized light. Appropriately setting the angle of rotation of the first retardation film 23, which is formed of a half wave plate, allows the pencil of light BL having passed through the first retardation film 23 to be converted into light containing beams BLs formed of an S-polarized component and beams BLp formed of a P-polarized component with respect to the polarization separator 25 mixed with each other at a predetermined ratio.

The light containing the beams BLs and BLp described above enters the homogenizer system 24. The homogenizer system 24 cooperates with the first light collection system 26 to achieve a uniform illuminance distribution formed by the beams BLs on the wavelength conversion unit 40. The homogenizer system 24 cooperates with the second light collection system 29 to achieve a uniform illuminance distribution formed by beams BLc1, which will be described later, on the diffusive reflector 30.

The homogenizer system 24 is formed, for example, of a first multi-lens array 24a and a second multi-lens array 24b. The first multi-lens array 24a includes a plurality of first lenses 24am, and the second multi-lens array 24b includes a plurality of second lenses 24bm. The plurality of second lenses 24bm correspond to the plurality of first lenses 24am in one-to-one relationship.

The wavelength conversion unit 40 and the diffusive reflector 30 are each located so as to be optically conjugate with the first lenses 24am of the first multi-lens array 24a. A light exiting region of each of the semiconductor lasers 21a is located so as to be optically conjugate with the second lenses 24bm of the second multi-lens array 24b.

The polarization separator 25 is disposed at the intersection of the optical axis ax1 and the illumination optical axis ax2, which are perpendicular to each other. The polarization separator 25 has a polarization separation function of separating the light having passed through the first retardation film 23 into the S-polarized component and the P-polarized component with respect to the polarization separator 25. Specifically, the polarization separator 25 reflects the beams BLs, which are formed of the S-polarized component, out of the light incident on the polarization separator 25. and transmits the beams BLp, which are formed of the P-polarized component, out of the incident light.

The beams BLs, which are formed of the S-polarized component, are reflected off the polarization separator 25 and travel toward the wavelength conversion unit 40. The beams BLp, which are formed of the p-polarized component, pass through the polarization separator 25 and travel toward the diffusive reflector 30.

The polarization separator 25 further has a color separation function of transmitting fluorescence YL, which will be described later and belongs to a wavelength band different from the wavelength band to which the pencil of light BL from the light source 21 belongs, irrespective of the polarization state of the fluorescence YL.

The S-polarized beams BLs having exited out of the polarization separator 25 enter the first light collection system 26. The first light collection system 26 causes the beams BLs to converge toward the wavelength converter of the wavelength conversion unit 40. The first light collection system 26 is formed, for example, of pickup lenses 26a and 26b.

The beams BLs having exited out of the first light collection system 26 enter the wavelength conversion unit 40. The configuration of the wavelength conversion unit 40 will be described later. The fluorescence YL outputted from the wavelength conversion unit 40 is parallelized by the first light collection system 26 and passes through the polarization separator 25.

On the other hand, the P-polarized beams BLp having exited out of the polarization separator 25 enter the second retardation film 28. The second retardation film 28 is formed of a quarter wave plate ($\lambda/4$ plate) disposed in the optical path between the polarization separator 25 and the diffusive reflector 30. The beams BLp are converted into circularly polarized beams BLc1 when passing through the second retardation film 28. The beams BLc1 having passed through the second retardation film 28 enter the second light collection system 29.

The second light collection system 29 causes the beams BLc1 to converge toward the diffusive reflector 30. The second light collection system 29 is formed, for example, of pickup lenses 29a and 29b.

The diffusive reflector 30 diffusively reflects the beams BLc1 having exited out of the second light collection system 29 toward the polarization separator 25. The diffusive reflector 30 is preferably a diffusive reflector that reflects the beams BLc1 incident thereon in the Lambertian reflection scheme.

The diffusive reflector 30 includes a diffusive reflection substrate 30A and a drive source 30M, which rotates the diffusive reflection substrate 30A, such as a motor. The axis of rotation of the drive source 30M is set so as to be substantially parallel to the optical axis ax1. The diffusive reflection substrate 30A is therefore configured to be rotatable in a plane that intersects with the primary ray of the beams BLc1 incident on a diffuser of the diffusive reflection substrate 30A. The diffusive reflection substrate 30A is formed, for example, in a circular shape when viewed in the direction of the axis of rotation.

Circularly polarized beams BLc2 having been reflected off the diffusive reflection substrate 30A and having passed through the second condenser system 29 pass through the second retardation plate 28 to form S-polarized beams BLs1.

The beams BLs1 are combined with the fluorescence YL by the polarization separator 25 to produce the white illumination light WL. The illumination light WL enters the uniform illumination system 80.

The uniform illumination system 80 includes an optical integration system 81, a polarization converter 82, and a superimposing lens 83. The uniform illumination system 80 achieves a uniform intensity distribution of the illumination light WL in an illuminated region. The illumination light WL having exited out of the uniform illumination system 80 enters the color separation system 3.

The optical integration system 81 is specifically formed, for example, of a lens array 81a and a lens array 81b. The lens arrays 81a and 81b are each formed of a plurality of lenses arranged in an array.

The lens array 81b along with the superimposing lens 83 brings images of the lenses of the lens array 81a into focus in the vicinity of an image formation region of each of the light modulators 4R, 4G, and 4B.

The illumination light WL having passed through the optical integration system 81 enters the polarization converter 82. The polarization converter 82 is formed, for example, of polarization separation films and retardation films, and converts illumination light WL into linearly polarized light. The polarization converter 82 may be omitted as required.

The illumination light WL having passed through the polarization converter 82 enters the superimposing lens 83. The superimposing lens 83 causes sub-luminous fluxes having exited out of the polarization converter 82 to converge and superimposes the convergent sub-luminous fluxes on one another in the vicinity of the image formation region of each of the light modulators 4R, 4G, and 4B. In the present embodiment, the optical integration system 81 and the superimposing lens 83 achieve a uniform illuminance distribution in the illuminated region.

The configuration of the wavelength conversion unit 40 will next be described.

Figure 3:
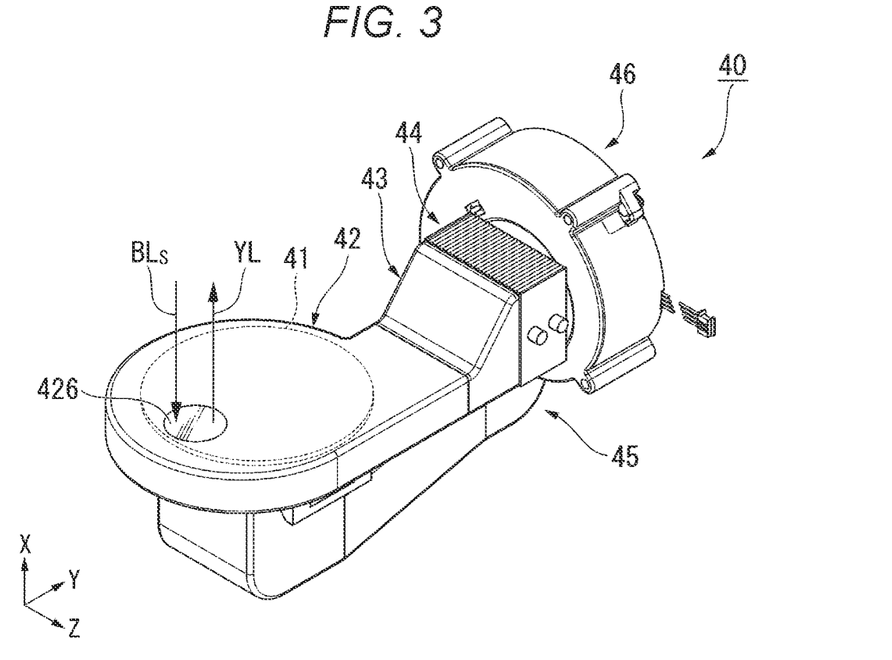
FIG. 3 is a perspective view showing a schematic configuration of a wavelength conversion unit.
Figure 4:
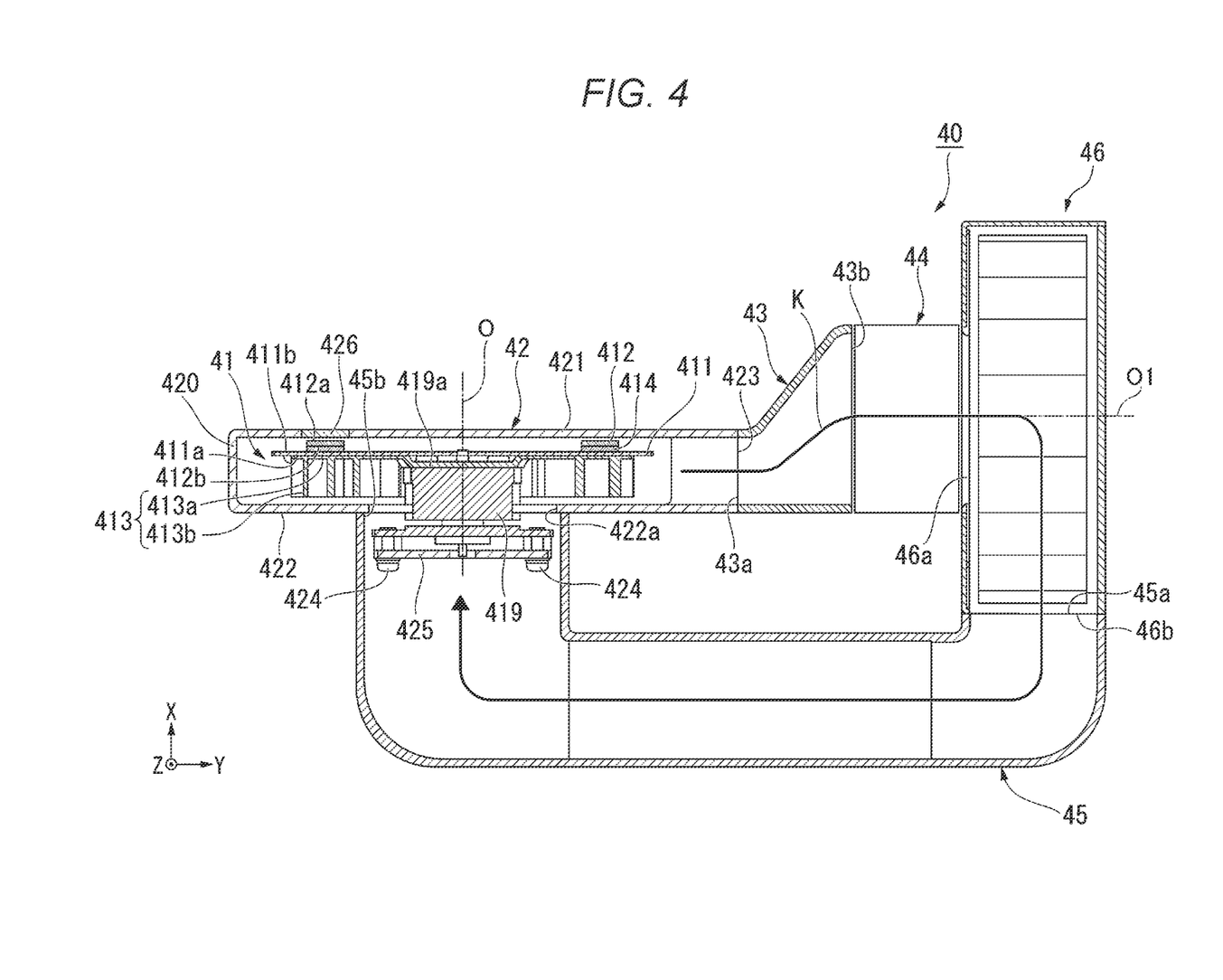
FIG. 4 is a cross-sectional view showing the schematic configuration of the wavelength conversion unit.
Figure 5:
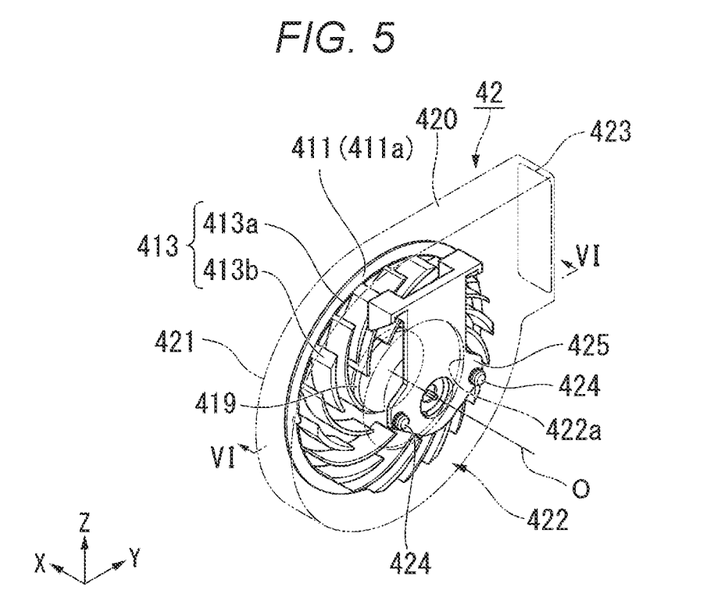
FIG. 5 is a perspective view showing the configurations of key parts of a wavelength conversion wheel.
Figure 6:
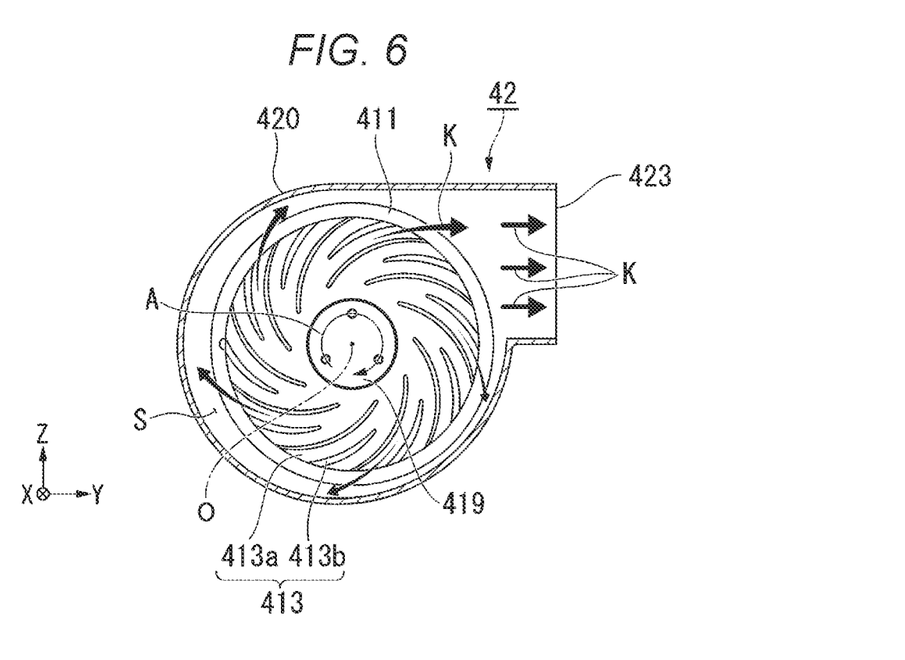
FIG. 6 is a cross-sectional view of the wavelength conversion wheel taken along the line VI-VI in FIG. 5.

FIG. 3 is a perspective view showing a schematic configuration of the wavelength conversion unit 40. FIG. 4 is a cross-sectional view showing the schematic configuration of the wavelength conversion unit 40. FIG. 5 is a perspective view showing the configurations of key parts of a wavelength conversion wheel 41. FIG. 6 is a cross-sectional view of the wavelength conversion wheel 41 taken along the line VI-VI in FIG. 5.

The wavelength conversion unit 40 in the present embodiment includes the wavelength conversion wheel 41, which is an optical element wheel, a shroud 42, which also serves as a housing, a first duct 43, a heat exchanger 44, a second duct 45, and a fan 46, as shown in FIGS. 3 and 4.

The wavelength conversion wheel 41 includes a wheel substrate 411, a wavelength converter 412, which is an optical element, a heat dissipation member 413, and a rotation driver 419, as shown in FIG. 4. The rotary driver 419 is formed, for example, of a motor. The rotary driver 419 includes a rotation support 419a, which is rotatable around a center axis O. The rotation support 419a rotatably supports the wheel substrate 411 around the center axis O.

An XYZ orthogonal coordinate system is used as required in the following description.

In the drawings, an axis X is the optical axis of the fluorescence YL outputted from the wavelength conversion unit 40 and extends along the illumination optical axis ax2. An axis Y is perpendicular to the axis X and extends along an axis of rotation O1 of the fan 46. An axis Z is perpendicular to the axes X and Y.

The radial direction with respect to the center axis O is simply called a "radial direction". The direction away from the center axis O in the radial direction is called "outward radial direction", and the direction approaching the center axis O in the radial direction is called an "inward radial direction". The circumferential direction around the center axis O is simply called a "circumferential direction". The direction along the center axis O is called an "axial direction", with one side of the axial direction called a "one-side axial direction", and the other side of the axial direction called an "other-side axial direction".

The wheel substrate 411 is formed of an annual plate made of metal that excels in heat dissipation, for example, aluminum and copper. That is, in the present embodiment, the wheel substrate 411 has thermal conductivity.

The wavelength converter 412 is provided on the side facing a front surface 411b of the wheel substrate 411, which is the other surface opposite from a rear surface 411a of the wheel substrate 411, which is one surface thereof. The wavelength converter 412 is formed in an annular shape around the center axis O on the front surface 411b of the wheel substrate 411. That is, the wavelength converter 412 is provided in the shape of a ring around the center axis O.

The wavelength converter 412 is excited by the beams BLs as the excitation light incident via a front surface 412a and emits the fluorescence YL, which is yellow light containing red light and green light, via the front surface 412a. The wavelength converter 412 is made, for example, of YAG:Ce, which is garnet crystal (YAG) expressed by $Y_3Al_5O_{12}$ to which cerium ions ($Ce^{3+}$, for example) are added. Although not shown, the wavelength converter 412 may contain suitable scatterers.

In the present embodiment, a reflection member 414 is provided between a rear surface 412b of the wavelength converter 412 and the front surface 411b of the wheel substrate 411. The reflection member 414 reflects the light emitted via the rear surface 412b of the wavelength converter 412 toward the front surface 412a of the wavelength converter 412.

The heat dissipation member 413 is provided at the rear surface 411a of the wheel substrate 411, as shown in FIGS. 4 and 5. The heat dissipation member 413 includes a base 413a and a plurality of heat dissipation fins 413b. The base 413a is bonded to the rear surface 411a of the wheel substrate 411. The base 413a is formed of a circular plate made of metal that excels in heat dissipation, for example, aluminum and copper. The base 413a has the same external shape as that of the wheel substrate 411.

The plurality of heat dissipation fins 413b are provided on a side of the base 413a, the side opposite from the wheel substrate 411, as shown in FIGS. 5 and 6. In the present embodiment, the plurality of heat dissipation fins 413b are integrated with the base 413a. The plurality of heat dissipation fins 413b are located on the side radially outward from the rotation driver 419 and extend radially in all directions toward the outer edge of the base 413a. The heat dissipation fins 413b are each arcuately curved and extend obliquely with respect to a normal to the outer edge of the base 413a. In the present embodiment, the plurality of heat dissipation fins 413b are formed of long and short fins arranged alternately in the circumferential direction around the center axis O.

The shroud 42 houses the wavelength conversion wheel 41 therein. The shroud 42 has an outer circumferential wall 420, which covers the outer circumference of the wavelength conversion wheel 41, a first lid 421, which is coupled to one end of the outer circumferential wall 420 in the axial direction thereof, which is the end facing the side +X, a second lid 422, which is coupled to the other end of the outer circumferential wall 420 in the axial direction thereof, which is the end facing the side −X, and an opening 423, which is formed at part of the outer circumferential wall 420.

The outer circumferential wall 420 may be integrated with one of the first lid 421 and the second lid 422, or may be formed as a part separate from the first lid 421 and the second lid 422. The outer shape of the shroud 42 is formed of a circular portion formed along the outer circumference of the wavelength conversion wheel 41 and a straight portion extending toward the opening 423.

In the present embodiment, the shroud 42 includes a light transmissive section 426, which allows light to be incident on the wavelength converter 412 of the wavelength conversion wheel 41 and transmits the fluorescence YL emitted from the wavelength converter 412 which is reflected off the reflection member 414.

The light transmissive section 426 is provided at least in a portion of the first lid 421 of the shroud 42, the portion which faces the wavelength converter 412 and with which the optical path of the beams BLs caused to converge by the first light collection system 26 intersects, as shown in FIG. 3. The light transmissive section 426 transmits the fluorescence YL generated by the wavelength converter 412.

The light transmissive section 426 may instead be formed of the pickup lens 26b of the first light collection system 26. Still instead, the entire first lid 421 may be formed of a light transmissive member made, for example, of glass or plastic to omit the light transmissive section 426.

The second lid 422 of the shroud 42 has an opening 422a, which is formed substantially at the center of the second lid 422, and a fixing member 425, which radially extends inward from the outer circumferential edge of the opening 422a and overlaps with the opening 422a in the axial direction, as shown in FIGS. 4 and 5.

In the present embodiment, the wavelength conversion wheel 41 is so configured that the rotation driver 419 protrudes outward beyond the shroud 42 via the opening 422a. The wavelength conversion wheel 41 is held by the shroud 42 with the rotation driver 419 fixed to the fixing member 425 of the second lid 422 via screw members 424.

The outer circumferential wall 420 of the shroud 42 has a circular shape when viewed in the axial direction, as shown in FIG. 6. The center axis O of the wavelength conversion wheel 41 is eccentric to the center of the outer circumferential wall 420 and shifted toward the opening 423. A gap S between the wavelength conversion wheel 41 and the outer circumferential wall 420 narrows as the position in the gap S approaches the opening 423.

The wavelength conversion wheel 41 in the present embodiment is so configured that the wheel substrate 411 is rotated around the center axis O to allow the plurality of heat dissipation fins 413b to cause the air sucked from an radially inner portion of the wheel substrate 411 to travel outward in the radial direction with the aid of the centrifugal force.

That is, the wavelength conversion wheel 41 generates airflow K traveling from the radially inner portion toward the radially outer portion through the rotation of the wheel substrate 411 that allows the air to be taken in via the opening 422a of the shroud 42. The heat dissipation member 413 generates the airflow K traveling from the radially inner portion toward the radially outer portion of the base 413a irrespective of the shape of the heat dissipation fins 413b and the direction of the rotation of the base 413a.

Rotating the wheel substrate 411 in the direction indicated by the arrow A sends the airflow K via the opening 423 of the shroud 42. Part of the airflow K is collected in the wind tunnel formed of the gap between the outer circumferential wall 420 and the wheel substrate 411 and sent out of the shroud 42 via the opening 423.

The wavelength conversion wheel 41 in the present embodiment, which cases the airflow K to flow between the plurality of heat dissipation fins 413b as the wheel substrate 411 rotates, dissipates heat of the wavelength converter 412 formed on the wheel substrate 411. In the present embodiment, the airflow K having cooled the wheel substrate 411 and having therefore been heated is exhausted out of the shroud 42 via the first duct 43, so that an increase in the temperature in the shroud 42 is suppressed. The airflow K generated by the heat dissipation member 413 is also used to cool the rotation driver 419 attached to a central portion of the base 413a.

The first duct 43 is provided at the opening 423 of the shroud 42 and exhausts the airflow K generated by the wavelength conversion wheel 41 out of the shroud 42, as shown in FIG. 4. The first duct 43 is formed of a tubular member and has an inlet 43a and an outlet 43b. The inlet 43a of the first duct 43 is disposed at the opening 423 of the shroud 42. The heat exchanger 44 is disposed at the outlet 43b of the first duct 43, and the airflow K exhausted via the outlet 43b flows through the heat exchanger 44.

In the present embodiment, the area of the outlet 43b is greater than the area of the inlet 43a. The first duct 43 has a shape having a cross-sectional area that gradually increases from the inlet 43a toward the outlet 43b. The outlet 43b has the same outline as that of the heat exchanger 44. The first duct 43, which has the outlet 43b having a large area, can supply the entire heat exchanger 44 with the airflow K.

In the present embodiment, the heat exchanger 44 is formed, for example, of a radiator. The heat exchanger 44 absorbs the heat from the airflow K by exchanging heat between a heat exchanging liquid that flows through the interior of the heat exchanger 44 and the airflow K. The temperature of the airflow K having cooled the wavelength converter 412 of the wavelength conversion wheel 41 and having therefore been heated can therefore be lowered.

The airflow K having traveling through the heat exchanger 44 flows into the fan 46, as shown in FIG. 4. The fan 46 sucks the airflow K from the downstream of the heat exchanger 44 and supplies the second duct 45 with the sucked airflow K.

The fan 46 in the present embodiment is formed of a centrifugal fan. The fan 46 has an intake port 46a and a exhaust port 46b. The intake port 46a is perpendicular to the axis of rotation O1 of the fan 46 and faces the heat exchanger 44. The exhaust port 46b opens in the direction -X, which is perpendicular to the axis of rotation O1, and communicates with the second duct 45.

The second duct 45 guides the airflow K having flowed through the heat exchanger 44 and the fan 46 to the heat dissipation member 413 of the wavelength conversion wheel 41, as shown in FIG. 4. The second duct 45 is formed of a substantially tubular member extending from the fan 46 toward the shroud 42 and has an inlet 45a and an outlet 45b. The inlet 45a of the second duct 45 is coupled to the exhaust port 46b of the fan 46. The outlet 45b of the second duct 45 is coupled to the shroud 42 so as to close the opening 422a formed in the second lid 422.

In the present embodiment, the second duct 45 guides the airflow K via the opening 422a to a central portion of the heat dissipation member 413 formed as part of the wheel substrate 411. The airflow K supplied from the second duct 45 flows from the radially inner portion toward the radially outer portion of the wheel substrate 411 with the aid of the heat dissipation member 413 to cool the wavelength converter 412 formed on the wheel substrate 411.

As described above, according to the wavelength conversion unit 40 in the present embodiment, the airflow K caused by the rotating wavelength conversion wheel 41 to travel radially outward is rectified by the outer circumferential wall 420 of the shroud 42 and concentrated to the opening 423, whereby the discharge pressure of the airflow K that exits via the opening 423 can be increased. The airflow K having a temperature lowered by the heat exchanger 44 is then circulated to the heat dissipation member 413 of the wavelength conversion wheel 41 housed in the shroud 42. A wavelength conversion unit 40 having improved cooling efficiency can thus be provided.

Therefore, the wavelength conversion unit 40 in the present embodiment, which suppresses an increase in the temperature of the wavelength converter 412 to increase the efficiency at which the excitation light is converted into the fluorescence YL, can generate bright fluorescence YL.

The wavelength conversion unit 40 in the present embodiment further includes the fan 46, which sucks the airflow K having flowed through the heat exchanger 44 and supplies the second duct 45 with the sucked airflow K.

The configuration described above, in which the fan 46 sucks the airflow K to assist in causing the airflow K to flow into the heat exchanger 44, can increase the efficiency at which the heat exchanger 44 cools the airflow K. Furthermore, increasing the speed of the airflow K supplied by the fan 46 from the second duct 45 to the wavelength conversion wheel 41 can increase the efficiency of the cooling performed by the heat dissipation fins 413b of the wavelength conversion wheel 41.

The fan 46 in the wavelength conversion unit 40 in the present embodiment is a centrifugal fan having the intake port 46a, which faces the heat exchanger 44, and the exhaust port 46b, which opens in the direction perpendicular to the axis of rotation O1.

According to the configuration described above, in which the direction in which the fan 46 sucks the airflow K differs by 90 degrees from the direction in which the fan 46 exhausts the airflow K, the length of the second duct 45, which couples the fan 46 to the shroud 42, can be shortened. An increase in the size of the wavelength conversion unit 40 can therefore be suppressed.

In the wavelength conversion unit 40 in the present embodiment, the shroud 42 includes the light transmissive section 426, which allows light to be incident on the wavelength converter 412 of the wavelength conversion wheel 41 and transmits the fluorescence YL emitted from the wavelength converter 412.

According to the configuration described above, a wavelength conversion unit 40 that efficiently cools the reflective wavelength conversion wheel 41 accommodated in the shroud 42 can be provided.

The light source apparatus 2 according to the present embodiment includes the wavelength conversion unit 40 and the light source 21, which radiates the beams BLs to the wavelength conversion unit 40.

The light source apparatus 2 according to the present embodiment, which includes the closed-circulation wavelength conversion unit 40 having improved cooling efficiency, can generate bright illumination light WL.

The projector 1 according to the present embodiment includes the light source apparatus 2, the light modulators 4B, 4G, and 4R, which modulate the light outputted from the light source apparatus 2 in accordance with image signals, and the projection optical apparatus 6, which projects the light modulated by the light modulators 4B, 4G, and 4R.

The projector 1 according to the present embodiment, which modulates the bright illumination light WL, can be a projector that excels in display quality.

Second Embodiment

A second embodiment of the present disclosure will be described below. The basic configuration of the wavelength conversion unit in the second embodiment is the same as that in the first embodiment, but the second embodiment differs from the first embodiment in that the fan is omitted. Basic configurations common to those in the first embodiment therefore have the same reference characters and will not be described in detail.

Figure 7:
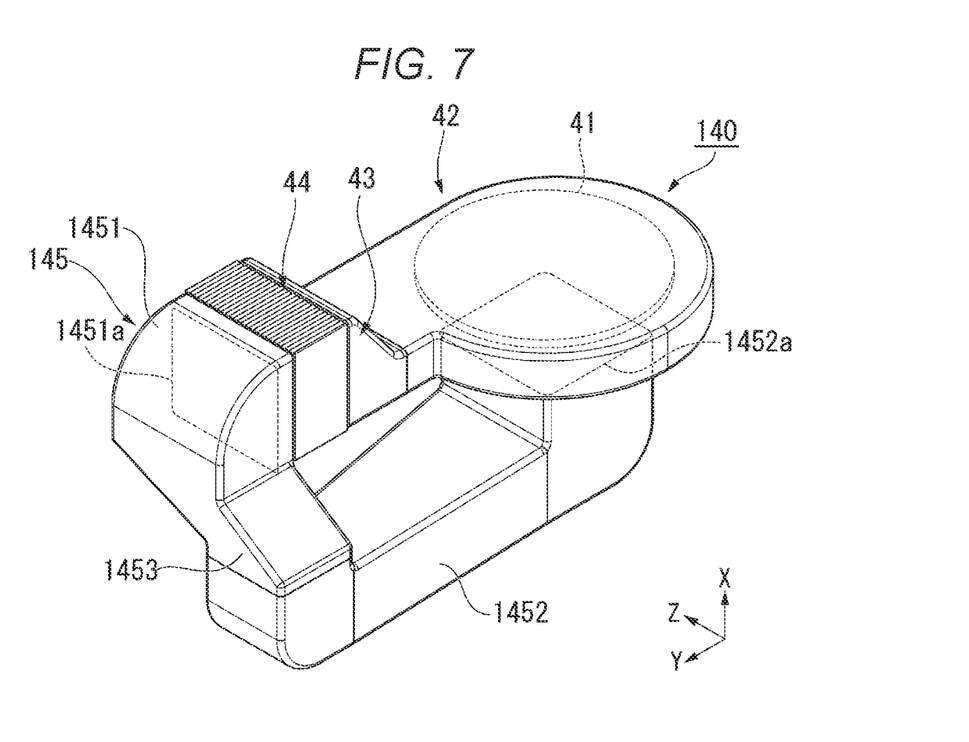
FIG. 7 is a perspective view showing a schematic configuration of the wavelength conversion unit in a second embodiment.

FIG. 7 is a perspective view showing a schematic configuration of a wavelength conversion unit 140 in the present embodiment.

The wavelength conversion unit 140 according to the present embodiment includes the wavelength conversion wheel 41, the shroud 42, the first duct 43, the heat exchanger 44, and a second duct 145, as shown in FIG. 7.

In the present embodiment, the airflow K having flowed through the heat exchanger 44 flows into the second duct 145. The second duct 145 guides the airflow K having flowed through the heat exchanger 44 to the wavelength conversion wheel 41 housed in the shroud 42.

The second duct 145 in the present embodiment is a combination of a first portion 1451, a second portion 1452, and a third portion 1453. The first portion 1451 has an inlet 1451a and is coupled to the heat exchanger 44. The second portion 1452 has an outlet 1452a and is coupled to the opening 422a formed in the second lid 422 of the shroud 42 shown in FIG. 4. The third portion 1453 couples the first portion 1451 and the second portion 1452, which are disposed at different positions in the axis-Z direction, to each other. One end of the third portion 1453 is coupled to the lower end, the −X-side end, of the first portion 1451, and the other end of the third portion 1453 is coupled to the upper end, the +X-side end, of the second portion 1452.

In the wavelength conversion unit 140 in the present embodiment, the wavelength conversion wheel 41 can be efficiently cooled without using the fan 46, which is used in the first embodiment, by actively utilizing the increased discharge pressure of the rectified airflow K achieved by the outer circumferential wall 420 of the shroud 42. In addition, the wavelength conversion unit 140 can be a wavelength conversion unit having a compact apparatus configuration in which the fan 46 is omitted.

Third Embodiment

A third embodiment of the present disclosure will be described below. The basic configuration of the wavelength conversion unit in the third embodiment is the same as that in the first embodiment, but the third embodiment differs from the first embodiment in terms of the position where the fans is disposed. Basic configurations common to those in the first embodiment therefore have the same reference characters and will not be described in detail.

Figure 8:
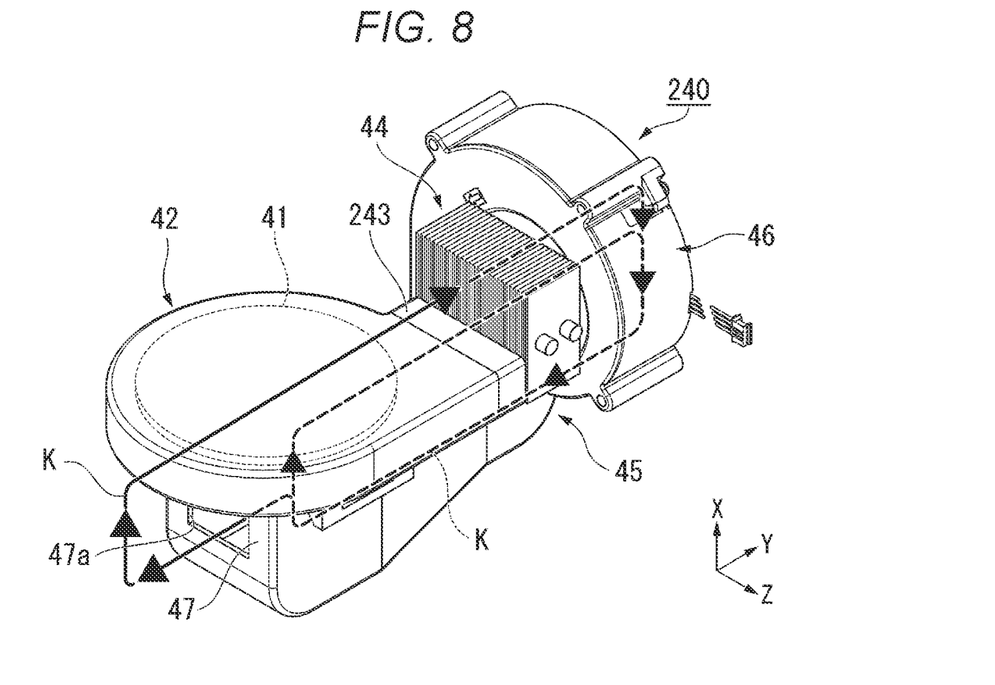
FIG. 8 is a perspective view showing a schematic configuration of the wavelength conversion unit in a third embodiment.

FIG. 8 is a perspective view showing a schematic configuration of a wavelength conversion unit 240 in the present embodiment.

The wavelength conversion unit 240 in the present embodiment includes the wavelength conversion wheel 41, the shroud 42, a first duct 243, the heat exchanger 44, the second duct 45, and the fan 46, as shown in FIG. 8.

The first duct 243 in the present embodiment has an outlet and an inlet having the same area. The first duct 243 in the present embodiment can supply a portion of the heat exchanger 44 with the airflow K.

The second duct 45 in the present embodiment has an opening 47a in a side wall 47 in the vicinity of a portion where the second duct 45 is coupled to the shroud 42. The second duct 45 supplies the interior of an enclosure of the light source apparatus 2 with the portion of the airflow K sent from the fan 46 via the opening 47a. The airflow K sent from the fan 46 is cooled when passing through the heat exchanger 44.

The light source apparatus using the wavelength conversion unit 240 in the present embodiment can therefore supply the interior of the light source apparatus with the cold airflow K via the second duct 45. The airflow K supplied to the interior of the light source apparatus via the opening 47a of the second duct 45 lowers the temperature inside the light source apparatus. Lowering the temperature prevents thermal damage or deformation of other optical parts such as the polarization separator 25, the first light collection system 26, and the second light collection system 29, which are disposed in the light source apparatus.

In the wavelength conversion unit 240 in the present embodiment, part of the heat exchanger 44 protrudes from the first duct 243. A portion of the heat exchanger 44 that is the portion protruding from the first duct 243 can therefore exhaust heat exhausted from the interior of the light source apparatus with the aid of the suction force produced by the fan 46. The heat exhausted by the heat exchanger 44 from the interior of the light source apparatus is cooled by the heat exchanger 44, and the cooled heat is reused to cool the wavelength conversion wheel 41 or the interior of the light source apparatus.

As described above, the wavelength conversion unit 240 in the present embodiment, which suppresses an increase in the temperature inside the light source apparatus, suppresses thermal damage or deformation of the optical parts, whereby the heat resistance of the light source apparatus can be further increased. The first duct 243 may be integrated with a member that forms the shroud 42.

Fourth Embodiment

A fourth embodiment of the present disclosure will be described below. The basic configuration of the wavelength conversion unit in the fourth embodiment is the same as that in the first embodiment, but the fourth embodiment differs from the first embodiment in terms of the position where the fan is disposed. Basic configurations common to those in the first embodiment therefore have the same reference characters and will not be described in detail.

Figure 9A:
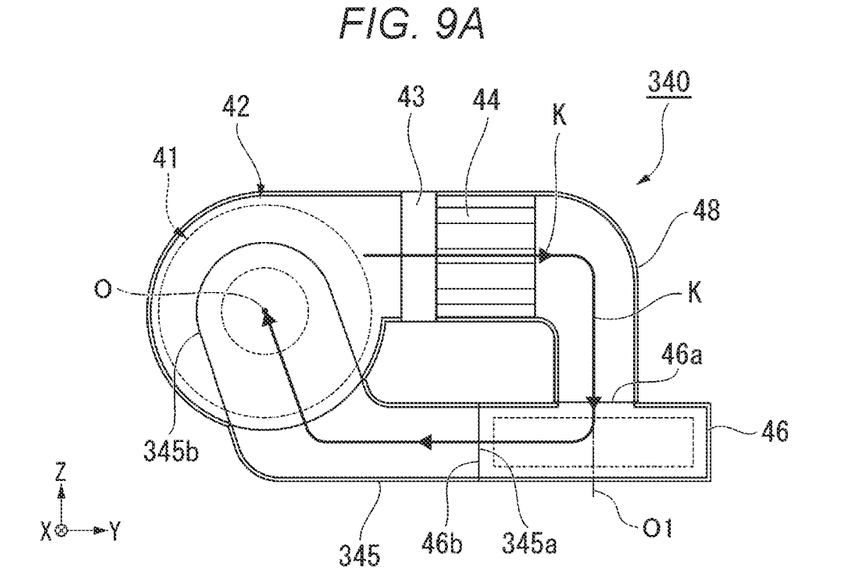
FIG. 9A is a plan view showing a schematic configuration of the wavelength conversion unit in a forth embodiment.
Figure 9B:
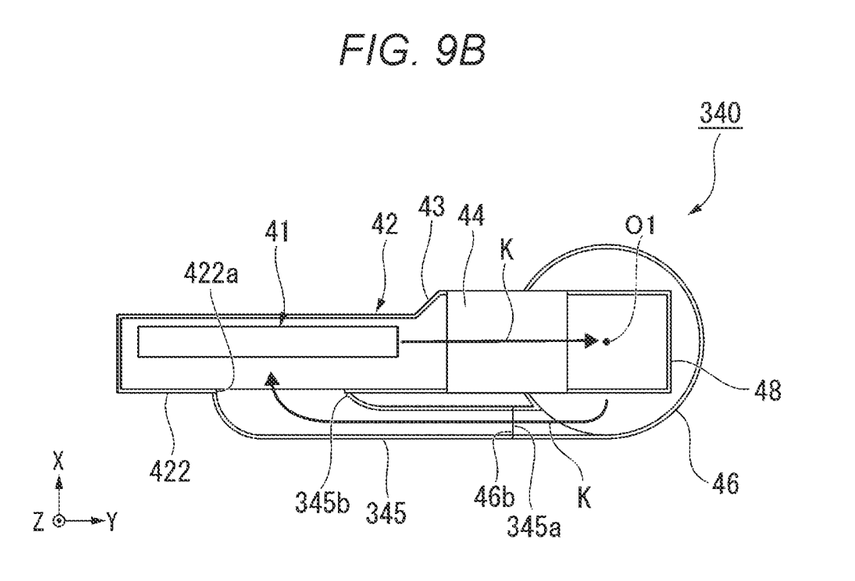
FIG. 9B is a side view showing the schematic configuration of the wavelength conversion unit in the fourth embodiment.

FIG. 9A is a plan view showing a schematic configuration of a wavelength conversion unit 340 in the present embodiment. FIG. 9B is a side view showing the schematic configuration of the wavelength conversion unit 340 in the present embodiment. FIG. 9A shows the wavelength conversion unit 340 viewed from the side −X, and FIG. 9B is a side view of the wavelength conversion unit 340 viewed from the side −Z.

The wavelength conversion unit 340 in the present embodiment includes the wavelength conversion wheel 41, the shroud 42, the first duct 43, the heat exchanger 44, a second duct 345, the fan 46, and a third duct 48, as shown in FIGS. 9A and 9B.

In the present embodiment, the axis of rotation O1 of the fan 46 is set in the axis-Z direction, which is perpendicular to the direction along the axis Y, which is the direction in which the airflow K flows in the heat exchanger 44. The third duct 48 guides the airflow K from the heat exchanger 44 to the fan 46. In the fan 46 in the present embodiment, the intake port 46a communicates with the third duct 48, and the exhaust port 46b communicates with an inlet 345a of the second duct 345. An outlet 345b of the second duct 345 is coupled to the shroud 42 so as to close the opening 422a formed in the second lid 422.

The wavelength conversion unit 340 in the present embodiment, which includes the third duct 48, increases the degree of freedom of the layout of the fan 46 with respect to the heat exchanger 44. In addition, the dimensions of the wavelength conversion unit 340 in the axis-Z direction can be reduced as compared with the dimensions in the layout in the first embodiment because the outline of the fan 46 does not protrude toward the side +Z with respect to the heat exchanger 44 unlike in the layout in the first embodiment.

The present disclosure has been described with reference to the embodiments by way of example but is not necessarily limited to the embodiments described above, and a variety of changes can be made thereto to the extent that the changes do not depart from the substance of the present disclosure.

For example, the aforementioned embodiments have been described with reference to a reflective wavelength conversion unit by way of example, and the optical element unit according to the present disclosure can also be used with a transmissive wavelength conversion unit. A transmissive wavelength conversion unit will be described below as a first variation.

First Variation

Figure 10:
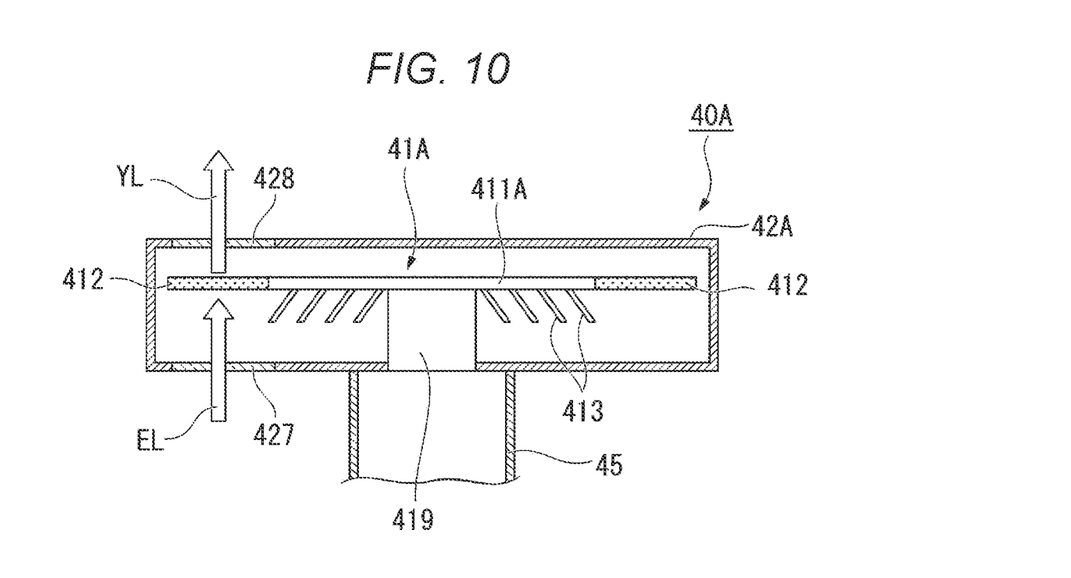
FIG. 10 is a cross-sectional view showing the configurations of key parts of the wavelength conversion unit according to a first variation.

FIG. 10 is a cross-sectional view showing the configurations of key parts of a wavelength conversion unit 40A according to the present variation. Basic configurations common to those in the first embodiment have the same reference characters and will not be described in detail.

In the wavelength conversion unit 40A according to the present variation, the wavelength converter 412 is attached to the radially outer side of a wheel substrate 411A of a wavelength conversion wheel 41A via a fixing member that is not shown, as shown in FIG. 10. The heat dissipation member 413 is provided on a side of the wheel substrate 411A, the side facing the rotation driver 419.

In the present variation, a shroud 42A further includes a light incident section 427, which causes excitation light EL to be incident on the wavelength converter 412 of wavelength conversion wheel 41A, and a light exiting section 428, which transmits and outputs the fluorescence YL emitted in the direction away from the light incident section 427 from the wavelength converter 412 of wavelength conversion wheel 41A.

The wavelength conversion unit 40A according to the present variation, in which the transmissive wavelength conversion wheel 41A housed in the shroud 42A is efficiently cooled to suppress an increase in the temperature of the wavelength converter 412 to increase the efficiency at which the excitation light EL is converted into the fluorescence YL, can generate bright fluorescence YL.

For example, the aforementioned embodiments have been described with reference to the case where the optical element unit according to the present disclosure is used as the wavelength conversion unit, and the optical element unit according to the present disclosure is also used as a diffusion unit in which a diffuser, which is an optical element, is formed on the wheel substrate in place of the wavelength converter 412. A diffuser unit will be described below as a second variation.

Second Variation

Figure 11:
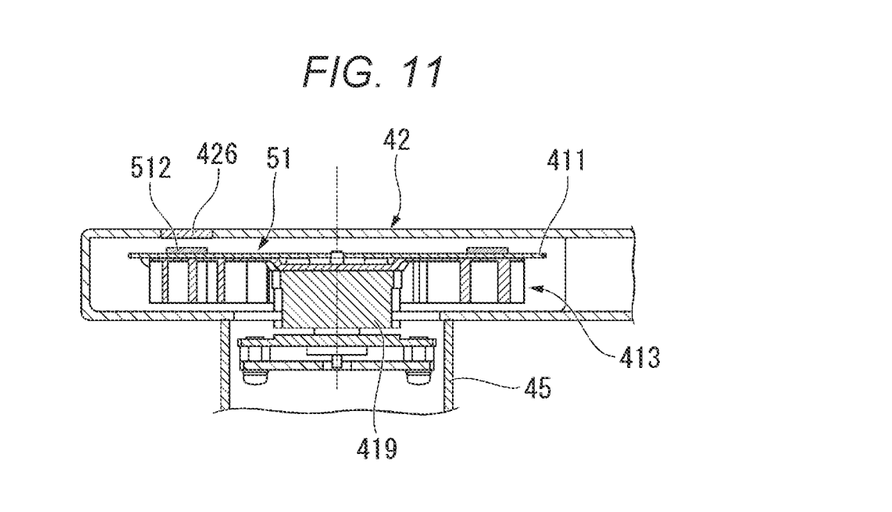
FIG. 11 is a cross-sectional view showing the configurations of key parts of a diffuser unit according to a second variation.

FIG. 11 is a cross-sectional view showing the configurations of key parts of a diffuser unit 50 according to the present variation. Basic configurations common to those in the first embodiment have the same reference characters and will not be described in detail.

The diffuser unit 50, which is the optical element unit according to the present variation, includes a diffusive reflection wheel 51, which is an optical element wheel, the shroud 42, the first duct 43, the heat exchanger 44, the second duct 45, and the fan 46, the latter four of which have been shown in FIG. 1, as shown in FIG. 11.

The diffusive reflection wheel 51 includes the wheel substrate 411, a diffusion element 512, which is an optical element, the heat dissipation member 413, and the rotation driver 419.

The diffuser unit 50 according to the present variation can replace, for example, the diffusive reflector 30 shown in FIG. 1. The diffuser unit 50 according to the present variation, in which the diffusive reflection wheel 51 accommodated in the shroud 42 is efficiently cooled to suppress an increase in the temperature of the diffusive reflector 512, can suppress thermal damage or deformation of the diffusive reflector 512.

The diffuser unit 50 can be used as a transmissive diffuser unit by employing the same configuration of the wavelength conversion unit 40A shown in FIG. 10.

In the embodiments described above, the projector 1 including the three light modulators 4R, 4G, and 4B has been presented by way of example, and the present disclosure is also applicable to a projector that displays color video images via one light modulator. Furthermore, the light modulators are not limited to the liquid crystal panels described above and can instead, for example, be digital mirror devices.

In the embodiments described above, the light source apparatus according to the present disclosure is used in a projector by way of example, but not necessarily. The light source apparatus according to the present disclosure may be used as a lighting apparatus, such as a headlight of an automobile.

The shroud can be defined as a housing case or a wind conducting case as well as the housing.

An optical element unit according to an aspect of the present disclosure may have the configuration below.

The optical element unit according to the aspect of the present disclosure includes an optical element wheel including a wheel substrate, an optical element provided at the wheel substrate, and a heat dissipation member provided at one surface of the wheel substrate, the optical element wheel causing airflow to flow outward in the radial direction when the wheel substrate rotates, a housing including an outer circumferential wall that covers the outer circumference of the optical element wheel, an opening formed at part of the outer circumferential wall, a light transmissive section that transmits light from the optical element, the housing capable of housing the optical element wheel, a first duct which is provided at the opening of the housing and via which the airflow generated by the optical element wheel is exhausted out of the housing, a heat exchanger which is disposed at an outlet of the first duct and to which the airflow exhausted via the outlet flows, and a second duct that guides the airflow having flowed through the heat exchanger to the heat dissipation member of the optical element wheel.

The optical element unit according to the aspect of the present disclosure may further have a fan that sucks the airflow from the downstream of the heat exchanger and supplies the second duct with the sucked airflow.

In the optical element unit according to the aspect of the present disclosure, the fan may include an intake port that is perpendicular to the axis of rotation of the fan and faces the heat exchanger, and an exhaust port that opens in the direction perpendicular to the axis of rotation and communicates with the second duct.

In the optical element unit according to the aspect of the present disclosure, the axis of rotation of the fan may be set in the direction perpendicular to the direction in which the airflow flows in the heat exchanger, the optical element unit may further include a third duct that guides the airflow from the heat exchanger to the fan, and the fan has an intake port that communicates with the third duct and an exhaust port that communicates with the second duct.

In the optical element unit according to the aspect of the present disclosure, the light transmissive section of the housing may cause light to be incident on the optical element of the optical element wheel and transmit light that is reflected off the optical element wheel and exits out of the optical element.

In the optical element unit according to the aspect of the present disclosure, the light transmissive section of the housing may include a light incident section that causes light to be incident on the optical element of the optical element wheel, and a light exiting section that transmits and outputs light emitted from the optical element of the optical element wheel in the direction away from the light incident section.

In the optical element unit according to the aspect of the present disclosure, the optical element of the optical element wheel may be a wavelength converter.

In the optical element unit according to the aspect of the present disclosure, the optical element of the optical element wheel may be a diffuser.

A light source apparatus according to another aspect of the present disclosure may have the configuration below.

The light source apparatus according to the other aspect of the present disclosure includes the optical element unit according to the aspect of the present disclosure and a light source that radiates light to the optical element unit.

A projector according to still another aspect of the present disclosure may have the configuration below.

The projector according to the still other aspect of the present disclosure includes the light source apparatus according to the other aspect of the present disclosure, a light modulator that modulates light from the light source apparatus in accordance with image information, and a projection optical apparatus that projects the light modulated by the light modulator.

What is claimed is:

1. An optical element unit comprising:
an optical element wheel including a wheel substrate, an optical element provided at the wheel substrate, and at least one heat dissipation fin provided at one surface of the wheel substrate, the optical element wheel causing airflow to flow outward in a radial direction when the wheel substrate rotates;
a housing including an outer circumferential wall that covers an outer circumference of the optical element wheel, an exhaust opening formed at part of the outer circumferential wall, a light transmissive section that transmits light from the optical element, the housing capable of housing the optical element wheel;
a first duct which is provided at the exhaust opening of the housing and via which the airflow generated by the optical element wheel is exhausted out of the housing;
a heat exchanger which is disposed at an outlet of the first duct and to which the airflow exhausted via the outlet flows;
a second duct that guides the airflow flowing through the heat exchanger to the at least one heat dissipation fin of the optical element wheel;
an intake opening formed by a surface of the housing opposing the wheel substrate for air from the second duct to be taken into the housing via the intake opening as the wheel substrate rotates; and
a fan that sucks the airflow from downstream of the heat exchanger and supplies the second duct with the sucked airflow,
wherein the fan has
an intake port that is perpendicular to an axis of rotation of the fan and faces the heat exchanger, and
an exhaust port that opens in a direction perpendicular to the axis of rotation and communicates with the second duct,
the airflow from the exhaust opening of the housing flows in a first direction, and
the exhaust opening of the housing, the first duct, the heat exchanger and the intake port of the fan are disposed in order in the first direction.

2. The optical element unit according to claim 1,
wherein an axis of rotation of the fan is set in a direction perpendicular to a direction in which the airflow flows in the heat exchanger,
the optical element unit further comprises a third duct that guides the airflow from the heat exchanger to the fan, and
the fan has an intake port that communicates with the third duct and an exhaust port that communicates with the second duct.

3. The optical element unit according to claim 1,
wherein the light transmissive section of the housing causes light to be incident on the optical element of the optical element wheel and transmits light that is reflected off the optical element wheel and exits out of the optical element.

4. The optical element unit according to claim 1,
wherein the light transmissive section of the housing includes a light incident section that causes light to be incident on the optical element of the optical element wheel, and a light exiting section that transmits and outputs light emitted from the optical element of the optical element wheel in a direction away from the light incident section.

5. The optical element unit according to claim 1, wherein the optical element of the optical element wheel is a wavelength converter.

6. The optical element unit according to claim 1, wherein the optical element of the optical element wheel is a diffuser.

7. A light source apparatus comprising:
the optical element unit according to claim 1; and
a light source that radiates light to the optical element unit.

8. A projector comprising:
the light source apparatus according to claim 7;
a light modulator that modulates light from the light source apparatus in accordance with image information; and
a projection optical apparatus that projects the light modulated by the light modulator.

9. An optical element unit comprising:
an optical element wheel including a wheel substrate, an optical element provided at the wheel substrate, and at least one heat dissipation fin provided at one surface of the wheel substrate, the optical element wheel causing airflow to flow outward in a radial direction when the wheel substrate rotates;
a housing including an outer circumferential wall that covers an outer circumference of the optical element wheel, an exhaust opening formed at part of the outer circumferential wall, a light transmissive section that transmits light from the optical element, the housing capable of housing the optical element wheel; and
a heat exchanger into which the airflow discharged from the exhaust opening flows in a first direction and into which the airflow flows from the first direction,
wherein the optical element unit is configured to have the airflow that flows out from the heat exchanger in the first direction redirected to a second direction that intersects with the first direction, and
the optical element unit is configured to have the airflow that is redirected to the second direction redirected to a third direction that is the opposite direction to the first direction,
the optical element unit is configured to have the airflow that is redirected in the third direction flow into the heat exchanger in the third direction and flow out of the heat exchanger in the third direction, and
the optical element wheel is configured to have the airflow that is redirected to the third direction be taken in by the at least one heat dissipation fin as the wheel substrate rotates.

10. The optical element unit according to claim 9, wherein a first position of the heat exchanger where the airflow discharged from the exhaust port flows into the heat exchanger from the first direction and a second position of the heat exchanger where the airflow flows into the heat exchanger from the third direction are different positions when viewed from the first direction.

11. The optical element unit according to claim 10, wherein the heat exchanger at the first position and the heat exchanger at the second position are an integrated radiator.

12. The optical element unit according to claim 10, wherein the airflow discharged from the exhaust opening is directly flowed into the heat exchanger from the first direction.

13. The optical element unit according to claim 11, wherein the airflow discharged from the exhaust opening is directly flowed into the heat exchanger from the first direction.

* * * * *